United States Patent [19]

Reinecke

[11] 4,044,896
[45] Aug. 30, 1977

[54] APPARATUS FOR DISCHARGING STACKED ARTICLES IN DISCRETE GROUPS

[75] Inventor: Guenter Reinecke, Solingen-Graefrath, Germany

[73] Assignee: Benz & Hilgers GmbH., Dusseldorf, Germany

[21] Appl. No.: 724,077

[22] Filed: Sept. 17, 1976

[30] Foreign Application Priority Data

Oct. 7, 1975 Germany .............................. 2544754

[51] Int. Cl.² .............................................. B65G 59/10
[52] U.S. Cl. .............................. 214/8.5 H; 214/8.5 K; 214/8.5 SS; 221/297
[58] Field of Search ............ 214/8.5 H, 8.5 SS, 8.5 K; 221/222, 223, 297

[56] References Cited

U.S. PATENT DOCUMENTS

| | | | |
|---|---|---|---|
| 2,692,691 | 10/1954 | Harriss | 214/8.5 K |
| 3,712,483 | 1/1973 | Messervey | 214/8.5 K |

*Primary Examiner*—Robert J. Spar
*Assistant Examiner*—George F. Abraham

[57] ABSTRACT

Facilities are associated with the discharge end of an article stacker, suitable for use in container-filling applications, so that the articles are discharged from the stacker in discrete groups of N articles each. A system of horizontally extending projections are provided on a pair of cylindrical blocking members that act as escapement devices at the bottom of the stacker. The successive projections on the cylindrical blocking members are cyclically moved into engagement with the lower ends of peripheral rims on the N lowermost articles in the stack, after which the N engaged articles are successively discharged from the bottom of the stacker. During the engagement and discharge of the N lowermost articles, the stacked articles overlying the lowermost N articles are inhibited from downward movement in the stacker. After the discharge of the lowermost N articles, the next N articles in the stack are moved downwardly into operative position for discharge after a predetermined interval.

4 Claims, 2 Drawing Figures

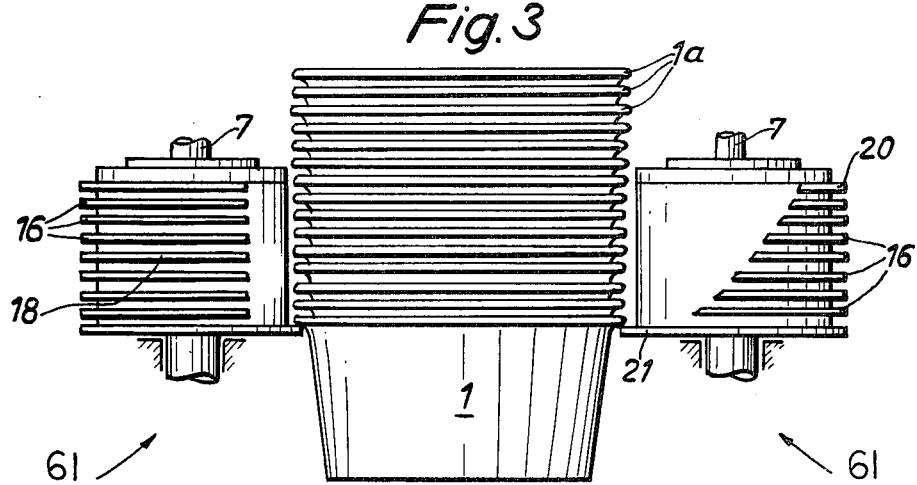
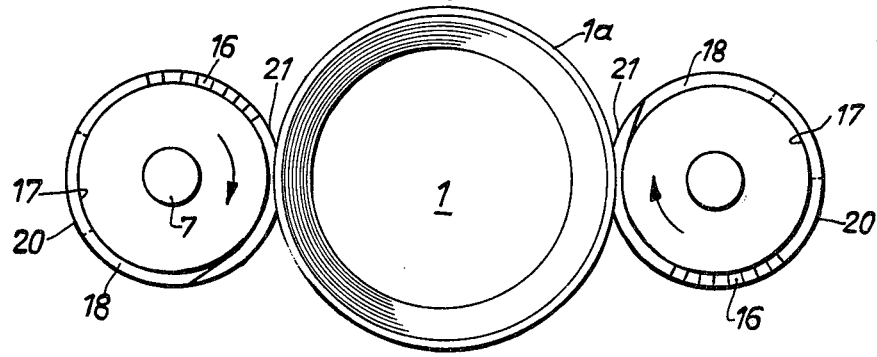
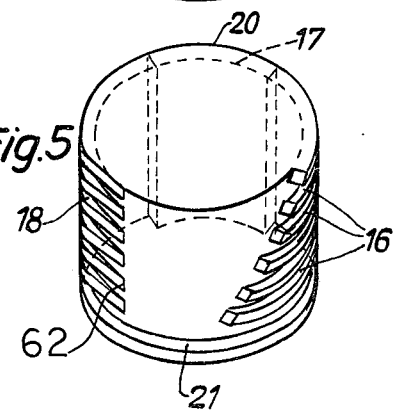

APPARATUS FOR DISCHARGING STACKED ARTICLES IN DISCRETE GROUPS

BACKGROUND OF THE INVENTION

The invention relates to apparatus for discharging a plurality of stacked articles.

Such apparatus is conventionally employed and associated with a conveyor system during the filling and sealing of containers on an assembly line. In particular, one series of stackers may be employed for the feeding of containers to be filled, while another plurality of such stackers may be employed in cooperatively timed relation for the discharge of covers to seal such containers after the filler has been introduced therein.

In existing arrangements of this type, since the feeding and filling of the containers is intermittent, it has been found necessary to bring the drive mechanism for the stacker discharge facilities to a complete stop between successive stacker operations, in order to accommodate dwell times between successive advances of the conveyor. In addition, separate and cooperatively timed stackers have generally been necessary for supplying the various components of the separately sealed articles.

SUMMARY OF THE INVENTION

Such disadvantages are overcome by the stack discharge apparatus of the present invention. In an illustrative embodiment, wherein all of the stacked articles exhibit correspondingly configured and spaced peripheral rims, the articles to be fed are supported in vertically stacked relation, and at least two rotatably ganged cylindrical blocking members are positioned in parallel and circumferentially spaced relation around the periphery of the rims of the article stack.

The lowermost N articles in the stack are disposed in confronting relation to a plurality of axially spaced projections extending horizontally from the periphery of the associated blocking members. A cyclically operable drive is associated with the ganged blocking members for rotating the blocking members in a specified first direction to progressively move the axially spaced projections on the blocking members into engagement with the lower ends of the peripheral rims of the N lowermost articles in the stack. During a further rotation of the blocking members in the first direction, the so-engaged lowermost articles are serially discharged from the bottom of the stack supporting means to the conveyor belt or other utilization device.

The system of projections on the blocking members are so arranged that the stacked articles overlying the lowermost N articles are inhibited from downward movement in the stacking facility during the above-mentioned engagement and discharge of the N lowermost articles.

Several embodiments of the projection facilities on the blocking members are described. In one embodiment, the projections comprise identical segments of constant length which are disposed in circumferentially staggered relation around the periphery of the associated support member. Preferably, the segments collectively define a full 360° circle around the periphery of the blocking member. With such arrangement, the rotation of the blocking members in the first direction, after the lowermost article has been seated on the bottom projection, is effective to permit sequential release of the N lowermost articles in the stack, in the direction from bottom to top. The next group of articles may be lowered into operative position in such arrangement by merely reversing the direction of rotation of the blocking members, and moving the reversed blocking members back to their original position.

Alternatively, the projection structure on each blocking member includes a bottom lip or rim extending around the periphery of the member for supporting the lowermost N articles in the stack before discharge. The remaining projections on each such blocking member comprise, in such arrangement, a plurality of segments having lengths that progressively decrease in an axially upward direction from the bottom of the rim; such segments respectively pick up the successively higher articles in the stack as the blocking member is rotated.

In order to permit release of the bottom N articles, the bottom lip and all of the overlying segments except the uppermost one on each blocking member are provided with aligned central cutouts. In addition, the uppermost segment on each blocking means, which bears against the lower peripheral rim of the first article of the next group, is effective to inhibit downward movement of the overlying articles during the discharge of the lowermost N articles.

With the above-described arrangement, it is not necessary to stop the main drive of the stacker at the end of the discharge of each group of articles; instead, automatic cyclic operation of the drive is provided successively for (1) discharging, from the bottom of the stack, the lowermost group of N articles, (2) advancing the overlying articles to the bottom of the discharge mechanism following such discharge, and (3) discharging the next group of N articles.

Moreover, by stacking different types of articles in groups of N each, wherein alternate ones of the groups represent, for example, containers, and the intervening group represents covers, a single stack can take the place of the multiple-stacking arrangements necessary in the prior art for feeding the various constituents of the filled package. All that is necessary, in such case, is that the peripheral rims of the successive groups, and the rim-to-rim distance, correspond to each other.

BRIEF DESCRIPTION OF THE DRAWING

The invention is further set forth in the following detailed description taken in conjunction with the appended drawing, in which:

FIG. 3 is an elevation view, similar to FIG. 1, illustrating a modification of the projection structure on the cylindrical blocking members associated with the article stacker;

FIG. 4 is a top view of the arrangement of FIG. 3; and

FIG. 5 is a perspective view illustrating the projection structure on the modified cylindrical blocking members of FIGS. 3–4.

DETAILED DESCRIPTION

Figure 1:
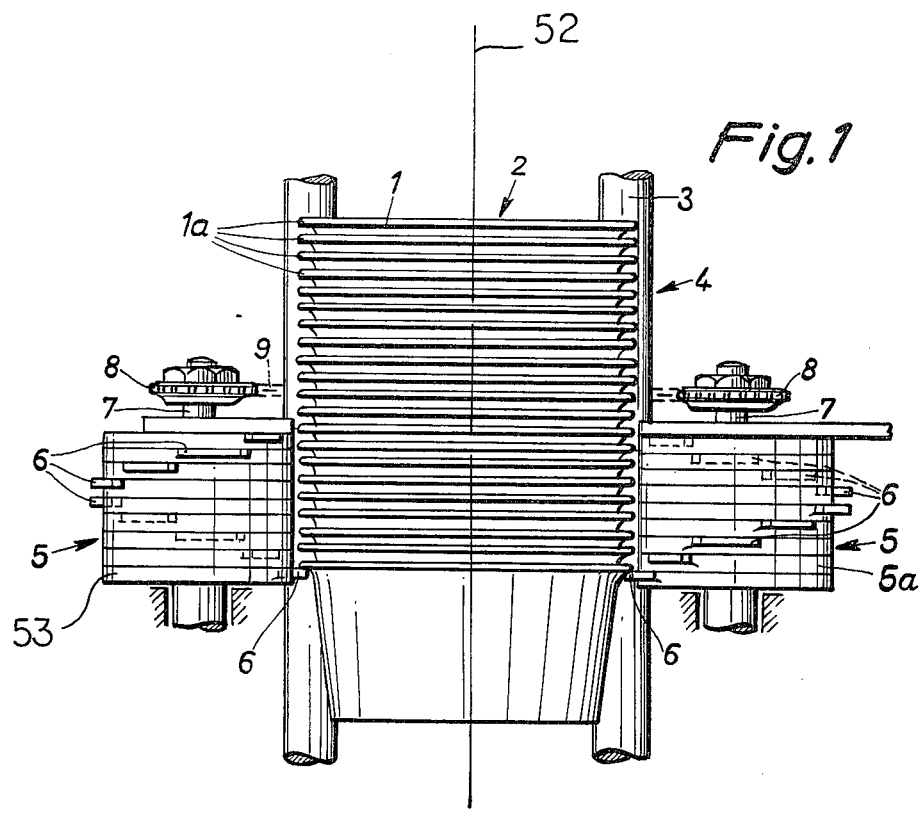
FIG. 1 is an elevation view of a group-discharge article stacker constructed in accordance with the invention.

Referring now to the drawing, the numeral 2 represents a column of stacked articles 1, each of which may be a cover, container, or other component of a package which is filled and sealed by suitable means (not shown). The successive articles 1 in the stack are successively released, in the manner described below onto a suitable conveyor belt (not shown) for transmission to a filling station or other suitable utilization apparatus.

Each of the articles 1, which may illustratively be formed from plastic, cardboard or the like, is provided with a peripheral rim 1a which cooperates with an escapement mechanism described below for the successive release of the articles in the stack.

The articles 1 are successively mounted as shown in FIG. 1 in a stacking arrangement 4 including a plurality of rods 3, 3. A plurality of shafts 7, 7 are disposed in surrounding relation to the stack 2, and are interconnected by a common drive belt 9 which in turn cooperates with a conical drive wheel set 10. The set 10, in turn, is coupled to a reversible drive 51.

The above-mentioned escapement mechanism includes a pair of cylindrical bodies 5, 5 individually affixed in coaxial relation to a pair of the shafts 7 situated on respectively opposite sides of a central axis 52 of the stacked column 2. The axes of the shaft 7 are parallel to the central axis 52.

Figure 2:
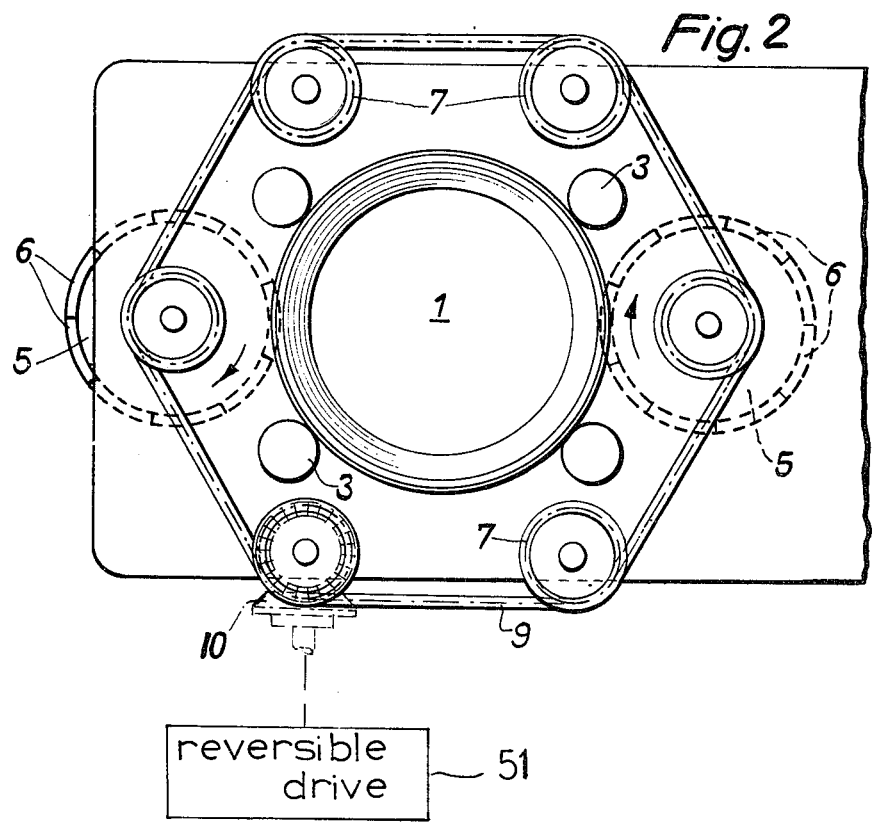
FIG. 2 is a top view of the arrangement of FIG. 1.

In the embodiment of FIGS. 1 and 2, successive ones of the discs 53 are provided with projecting segments 6, 6 which are of equal length and which are circumferentially staggered around the periphery of the overall body 5. The opposed bodies 5 are so arranged on their respective shafts that the positioning of corresponding segments 6 is symmetrical relative to the central axis 52. Thus, in the arrangement shown in FIG. 1, the lowermost ones of the segments 6 are in their radially innermost position relative to the axis 52.

Successive ones of the segments 6 are axially spaced by a distance corresponding to the distance between corresponding points (e.g., the bottom surface) of successive ones of the article rims 1a.

The system of projections 6 on each of the blocking members 5 are so chosen that the articles in the stack 2 are cyclically released in groups of N (N being an integer). For this purpose, the number of projections in FIGS. 1 and 2 are so arranged that illustratively N = 9. The circumferentially staggered projections 6 on each of the members 5 collectively subtend an angle of 360° around the periphery of the body 5, as viewed from the top in FIG. 2.

In operation, the article stack 2 is supported on the mounting arrangement 4 with the lowermost article in the stack resting against the inwardly extending bottom segments 6 on both of the cylindrical blocking members 5. The drive 51 is then actuated to rotate the shafts 7 and thus the cylindrical members 5 in the clockwise direction shown, whereby the successively higher segments 6 on the bodies 5 are rotated into engagement with the bottom surfaces of the peripheral rims 1a of successively higher ones of the stacked articles 1. During such rotation of the drive 51, the lowermost N articles on the stack will be successively released onto the not illustrated conveyor belt from bottom to top. After the release of such items, the uppermost one of the projections 6 on the cylindrical bodies 5 will be in supporting relation with the remaining articles in the stack.

At this point, the reversible drive 51 is rotated in the opposite direction, whereupon the segments 6 on the body 5 are rotated in the opposite sense to lower the next N items in the stack along the axis 52 until the position shown in FIG. 1 is again reached, with the lowermost article resting on the now-aligned bottommost segments 6. At this point, the drive 51 can be reversed again, leading to a new cycle of discharge.

Accordingly, the cyclic reversal of the drive 51 will lead to a corresponding cyclic discharge of successive groups of N articles each from the stack.

An alternative embodiment of the escapement mechanism shown in FIGS. 1-2 is illustrated in FIGS. 3-5. Corresponding elements in the embodiments of FIGS. 1-2 and FIGS. 3-5 have been given corresponding reference numerals.

The main distinction between the two embodiments is the configuration and orientation of the segment construction on the cylindrical escapement bodies. Thus, the constant-length circumferentially staggered segments 6, disposed around separate discs 53 in FIG. 1, are replaced in FIGS. 3-5 by a plurality of ribs 16, 16 which are disposed in axially spaced relation on a common periphery of each of a pair of cylindrical bodies 61. Preferably, the ribs 16 may be formed integral with the associated body 61.

Each body 61 has a lip 21 which extends around a bottom axial edge thereof, and functions in a manner corresponding to the lowermost segments 6 in FIGS. 1-2. The ribs 16 extend upwardly from the bottom lip 21 in axial spaced relation from the lip and from each other in the manner depicted in FIG. 5, with the successive ribs 16 having lengths that progressively decrease in the axially upward direction. The segments 16 terminate in aligned first ends 62, such ends 62 merging radially into the main outer periphery of the body 61.

The lip 21 and each of the overlying projections 16 except the uppermost one (designated at 20) are provided with aligned cutouts 17 intermediate their ends, such cutout extending radially inwardly to the main outer periphery of the body 61.

The axial distance between successive ones of the projections 16 corresponds to the axial distance between corresponding surfaces of the rims 1a of the articles, as in FIGS. 1-2. The system of projections 16 and the rib 21 are arranged in FIGS. 3-5 to release the stacked articles 1 in groups of N. To accomplish this in the arrangement of FIGS. 3-5, with the stacked articles illustratively in the position shown in FIG. 3, i.e., with the stack resting on the aligned lower lips 21 of the bodies 61, the bodies 61 are simultaneously rotated in like directions (e.g., clockwise as viewed in FIG. 4) such that each of the articles is successively picked up by a corresponding one of the projections 16 while the articles in the stack above the N lowermost articles are held fixed on the top surface of the upper projection 20.

When the members 61 have been rotated far enough so that the cutout area 17 is aligned with the rims 1a, the N lowermost articles are released from the stack. Since the cutout 17 terminates short of the uppermost segment 16, the overlying portion of the stack will continue to be inhibited from downward movement during the discharge of the lowermost group of articles.

Upon a further rotation of the blocking members 61 in the same direction to a distance sufficient to free the rims 1a from the inhibiting action of the projections 16, e.g., to a distance sufficient to move the trailing edges 62 of the projections 16 free of the rims 1a, the stack which had been resting on top of the uppermost segment 20 will be released, and the next N articles in the stack will move downward until the lowermost one of such articles again rests on the lips 21 at the bottom ends of the blocking members 61. Upon a still further rotation of the blocking members 61 in the same direction, a new cycle of discharge of the now-lowermost group of N articles can begin anew.

In the foregoing, some illustrative arrangements of the invention have been described. Many variations and modifications will now occur to those skilled in the art.

It is accordingly desired that the scope of the appended claims not be limited to the specific disclosure herein contained.

What is claimed is:

1. In an apparatus for discharging a plurality of stacked articles each having a peripheral rim, means for supporting the plurality of articles in vertically stacked relation, at least a pair of rotatably ganged cylindrical blocking members having vertical axes and disposed in circumferentially spaced relation around the periphery of the rims of the article stack, the blocking members respectively having corresponding axially spaced projections extending horizontally from the periphery thereof and engageable with the lower surfaces of the peripheral rims of the N lowermost successive ones of the stacked articles, and cyclically operable means for progressively moving the successive projections on the blocking members into engagement with the lower ends of the peripheral rims of the N lowermost articles in the stack and for thereafter discharging the N engaged lowermost articles from the bottom of the supporting means, the projection on at least one of the blocking members being adapted to inhibit a downward movement of the stacked articles overlying the lowermost N articles during the engagement and discharge of said N lowermost articles, whereby the articles are discharged from the apparatus in discrete groups of N articles each.

2. Apparatus as defined in claim 1, in which the projections on each blocking member comprise identical segments of constant length collectively extending 360° in circumferentially staggered relation around the periphery of the associated support member to permit sequential release of the N lowermost articles in the stack when the blocking members are rotated in a first direction, and in which the cyclically operable means comprises means for rotating the blocking members in the first direction.

3. Apparatus as defined in claim 2, further comprising means for reversing the direction of rotation of the blocking members after the discharge of said N lowermost articles to move the inhibited overlying articles to the bottom of the supporting means.

4. Apparatus as defined in claim 1, in which the lowermost projection on each blocking member is a lip extending around the periphery of the blocking member, in which the remaining projections on each blocking member comprise a plurality of segments having lengths that progressively decrease in an axially upward direction, corresponding first ends of said segments being in axial alignment, the lowermost lip and all of the overlying segments except the uppermost one on each blocking member having aligned central cutouts to permit a simultaneous release of the N lowermost articles of the stack when the blocking members are rotated in a first direction, and in which the cyclically operable means comprises means for rotating the blocking members in the first direction, whereby the uppermost segment on each blocking means is effective to inhibit downward movement of the overlying articles in the stack during the discharge of the lowermost N articles.

* * * * *